United States Patent

Mangleburg

[15] 3,664,176
[45] May 23, 1972

[54] METHOD AND APPARATUS FOR THE CALIBRATION OF TRANSDUCERS

[72] Inventor: Charles S. Mangleburg, Colonial Beach, Va.

[73] Assignee: The United States of America as represented by the Secretary of the Navy

[22] Filed: Mar. 23, 1970

[21] Appl. No.: 21,572

[52] U.S. Cl. .............................................................73/4 R
[51] Int. Cl. .....................................................G01l 27/00
[58] Field of Search ........................................73/1 A, 1 B, 4

[56] References Cited

UNITED STATES PATENTS

| | | | |
|---|---|---|---|
| 3,273,376 | 9/1966 | Aronson et al. | 73/4 R |
| 3,203,223 | 8/1965 | Petrow | 73/1 B |
| 3,034,332 | 5/1962 | Lederer | 73/4 R |

Primary Examiner—S. Clement Swisher
Attorney—R. S. Sciascia and Thomas O. Watson, Jr.

[57] ABSTRACT

A calibration system for the dynamic calibration of piezoelectric transducers used in the measurement of blast wave pressure caused by sudden changes of fluid pressure, such as in the firing of various weapons. A calibration chamber is used to create a blast wave of 100 psig upon the transducer being tested. A pressure pulse is generated and supplied to the calibration chamber and the electrical output of the transducer is recorded on a storage oscilloscope to form a first trace. A second trace is generated by a charge amplifier containing a calibration circuit having precision capacitors. The second trace is adjusted to fall upon the first generated trace and the transducer charge sensitivity is read directly from the sensitivity control on the charge amplifier. A series of tests can be used to determine the non-repeatability of the transducer and repetition at different pressures will determine its non-linearity.

2 Claims, 5 Drawing Figures

PATENTED MAY 23 1972

INVENTOR.
CHARLES S. MANGLEBURG
BY *Thomas O. Watson Jr.*

ATTORNEY

METHOD AND APPARATUS FOR THE CALIBRATION OF TRANSDUCERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to improvements in calibrating transducers, and more particularly it pertains to a new and improved method and apparatus for directly calibrating piezoelectric crystal transducers without calculation to determine the transducer charge sensitivity.

In certain types of work it is desirable to know the value of the voltage that will be developed across the polar faces of a given piezoelectric crystal feeding into a given electrical impedance when subjected to a dynamic fluid pressure of known value. A crystal so calibrated may then be used as a gauge to measure dynamic fluid pressure, such as blast waves caused by the firing of various weapons and other similar devices in which substantially sudden changes of fluid pressure occur.

Piezoelectric transducers must be calibrated dynamically because they do not have DC response due to the RC decay inherent in them. In the past, it has been the general practice to subject piezoelectric crystal transducers to a dynamic fluid pressure of known value and record a trace. With this information and by means of calculation the transducer could be calibrated. Such devices have not been completely satisfactory due to the complexity and inaccuracy of the method, and the need for computations in calibration.

The above disadvantages are overcome by the present invention which provides a method and apparatus for calibrating a transducer that is quick, simple and accurate and allows the transducer charge sensitivity (picocoulombs per psi) to be determined without the need of calculation.

SUMMARY OF THE INVENTION

The general purpose of this invention is to provide a system for the dynamic calibration of air blast gauges such as piezoelectric crystal transducers. There are several types of monoaxial crystals which respond electrically to fluid pressure and are suitable for use in pressure gauges. One of the most satisfactory of these is tourmaline. In the specification herein described, monoaxial crystals such as tourmaline, are used in the preferred embodiment, but it is to be understood that any crystal gauge responsive to dynamic fluid pressure may be calibrated, when suitably mounted, in the manner to be described in the invention.

A calibration chamber is used to create a blast wave of 100 psig upon the transducer being tested. A pressure pulse is generated and the resulting trace recorded on a storage oscilloscope. A second trace is generated by a charge amplifier containing a calibration circuit having precision capacitors. The second trace is adjusted to fall upon the first generated trace and the transducer charge sensitivity is ready directly from the sensitivity control on the charge amplifier. A series of tests can be used tof the
transducer and repetitions at different pressures will determine its non-linearity.

OBJECTS OF THE INVENTION

An object of the present invention is the provision of a quick, simple and accurate method, and a device therefor, for determining the charge sensitivity of a transducer.

Another object is to provide a method of calibrating a transducer which requires no calculation.

Other objects, advantages and novel features of the invention will become apparent from the following detailed description of the invention when considered in conjunction with the accompanying drawings.

DETAILED DESCRIPTION OF THE PREFERRED EMBODIMENT

Figure 1:
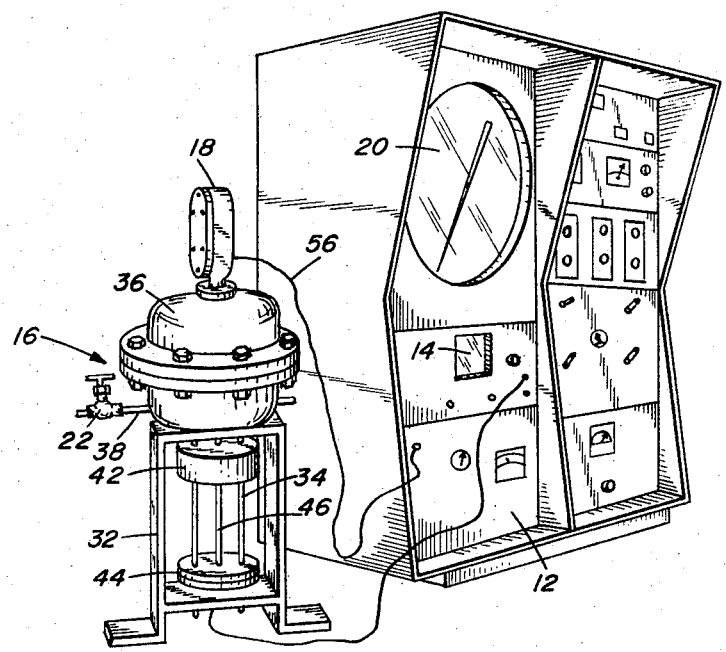
FIG. 1 is a perspective view of the preferred embodiment of the invention.
Figure 2:
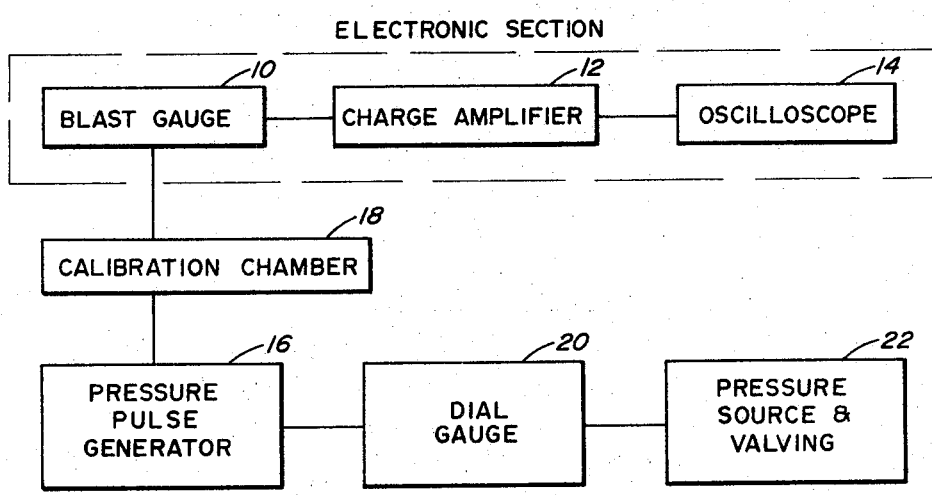
FIG. 2 is a block diagram of the overall calibration system.

The system shown in FIG. 1 is illustrated in the block diagram of FIG. 2. For convenience the system will be described in two sections; electronic and mechanical. The electronic section consists of an air blast transducer or blast gauge 10, a charge amplifier 12 and an oscilloscope 14. The mechanical section consists of a pressure pulse generator 16, a calibration chamber 18, a dial gauge 20 and a pressure source and valving system 22.

Figure 3:
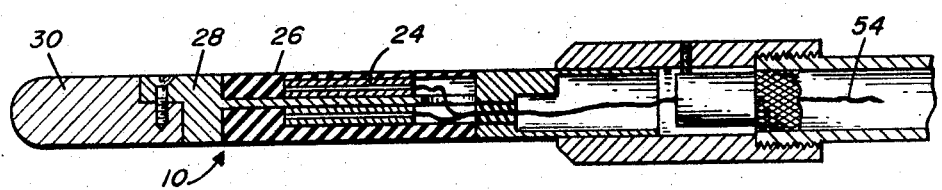
FIG. 3 illustrates a cross section of the transducer of the present invention.

Turning to the electronic section, the transducer or blast gauge 10, shown in FIG. 3, utilizes natural tourmaline piezoelectric crystals 24 cut perpendicular to the principal axis and stacked in a four element pile. The single elements are physically and electrically in parallel. Two elements are located on each side of the transducer and are protected by a rubber compound 26. A four element pile of one inch diameter discs produces a nominal sensitivity of 30 picocoulombs per psi with a nominal capacitance of 100 picofarads. An insert 28 which contains the elements can be removed from a baffle 30 for calibration.

The charge amplifier 12 chosen for the system was the Kistler Instrument Corporation Model 503. This amplifier's extremely high input impedance —nominally $10^{14}$ ohms — makes it attractive for this application. The design also simplifies calibration and no calculations are required to determine the transducer charge sensitivity.

The charge amplifier 12 consists of a charge-to-voltage converter, an adjustable gain voltage amplifier, a calibration or test signal circuit and a regulated power supply. The charge-to-voltage converter is an amplifier with high input impedance utilizing capacitive feedback to maintain the input near zero voltage. This allows the user to interchange cables of reasonable length and capacitance without appreciably affecting the transducer charge sensitivity. The voltage amplifier then boosts the output of the charge converter to useable levels: up to ± 10 volts for devices with high input impedance or ± 20 milliamperes for devices with low input impedance. The output of the charge amplifier 12 can be adjusted with the gain control of this voltage amplifier.

The test signal is produced by a calibration circuit which consists of an adjustable voltage and a group of precision capacitors. This provides a charge calibration circuit since the voltage applied to one of the capacitors gives a known charge ($Q=C \times V$). Using a ten turn, linear, calibrated potentiometer (transducer sensitivity control), this test signal —a stable one volt reference —can be reduced linearly to any value desired. The range switch selects the precision capacitor of appropriate value for the calibration circuit. Assume the range switch is in the 1000 psi position; this switches the 10,000 pfd calibration capacitor into the calibration circuit. If the transducer sensitivity control is set to 10 (full scale position), the full 1 volt is applied to the 10,000 pfd capacitor simulating a 10,000 pCb charge. This would correspond to a transducer of 10 pCb per psi charge sensitivity at full scale (1,000 psi). Reducing the transducer sensitivity control to three, reduces the voltage to 0.3 volts providing a 3,000 pCb charge. This will correspond to a transducer of 3 pCb per psi charge sensitivity at full scale (1,000 psi) or a transducer of 30 pCb per psi charge sensitivity at 100 psi. Thus an accurately known charge signal simulating a piezoelectric transducer at full scale output is inserted calibrating the charge amplifier 12 from back to front.

Although the complete calibration procedure is discussed below, the operation of the charge amplifier 12 during calibration will now be briefly explained. The test signal button is depressed applying the calibration voltage to the capacitor and the transducer sensitivity control adjusted until the voltage charge obtained is the same as that of a loaded transducer. The charge sensitivity of the transducer can then be read directly from the transducer sensitivity control. The gain control does not affect the calibration since both the test or calibration signals and the transducer signal are amplified equally.

The oscilloscope 14 used in this application was the Tektronix Type RM 564 with a type 3A3 vertical amplifier and a type 2B67 time base. This is a storage type oscilloscope, which in this application saves a great deal of time and expense since a permanent photographic record is not required. If a photograph is desired, this can easily be accomplished by attaching a camera to the oscilloscope after observation of the trace since the storage life of the image is quite long.

Figure 5:
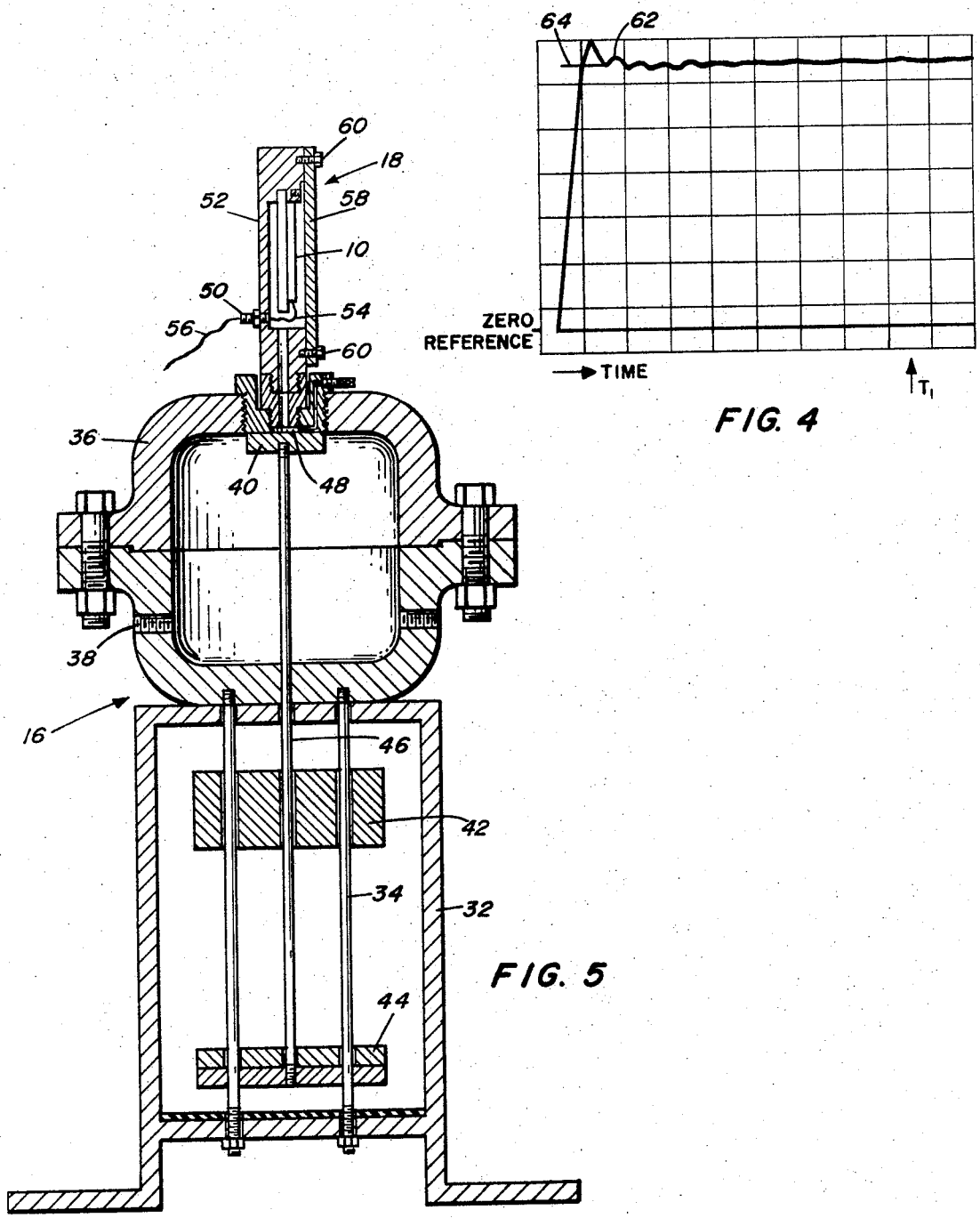
FIG. 5 is a cross section of the calibration chamber and pressure pulse generator.

Turning to the mechanical section, pressure pulse generator 16 is shown in FIG. 5 having a main pressure chamber 36 which rests on a support stand 32 having impact weight guides 34. The main pressure chamber 36 (see FIG. 5) is pressurized with nitrogen or another appropriate gas to the pressure desired by an input port 38 with the poppet valve 40 in the closed position. An impact weight 42 is released and strikes an impact plate assembly 44. The force is transferred to a valve stem 46 which causes the poppet valve 40 to open quickly. The pressure then equalizes in the main chamber 36 and the calibration chamber 18 via an orifice 48. Since the main chamber 36 has a much larger volume than the calibration chamber 18, the change in pressure in the main chamber is small and the process is essentially isothermal. A quartz crystal (not shown) located in the impact plate assembly 44 generates a voltage which triggers the oscilloscope 14 prior to the onset of the pressure pulse.

The calibration chamber 28 is located around the air blast transducer 10. Special consideration was given to keep the volume small and the orifice 48 connecting the two chambers 18 and 36 large to allow the pressure to stabilize as quickly as possible. The insert 28 in the transducer 10 is removed form its baffle 30 and is held in the calibration chamber 18 by a set screw. This completes the ground in the electrical circuit. A standard Microdot bulkhead connector 50 whose shell is in mechanical and electrical contact with the calibration chamber 18 is mounted on the chamber wall 52. A wire 54 from the inner conductor is attached to the signal output lead of the transducer 10. A Microdot low noise cable 56 is connected between the connector 50 on the calibration chamber 18 and the charge amplifier 12.

The calibration chamber 18 was designed so that the insert 28 could be installed with its smallest cross section perpendicular to the axis of the orifice 48 connecting the main chamber 36 with the calibration chamber 18. This allows the calibration chamber to fill more quickly while distributing the pressure equally over both sides of the transducer 10. It also more closely simulates field conditions.

One complete side wall 58 of the calibration chamber 18 is removable to allow installation of the transducer 10. The side is held in place by screws 60 and a pressure seal is effected with a rubber 0-ring.

The tubing used in this system is stainless steel to allow for pressures up to 1000 psig for other transducers. The pressure read out is a 16 inch 100 psig dial gauge 20 whose accuracy is 0.1 percent of full scale with a higher pressure gauge available for pressures up to 1,000 psig. In addition to the normal input and exhaust valves 22, a pressure volume control (not shown) is included which allows the pressure in the main chamber 36 to be easily and accurately set.

CALIBRATION PROCEDURE

Figure 4:
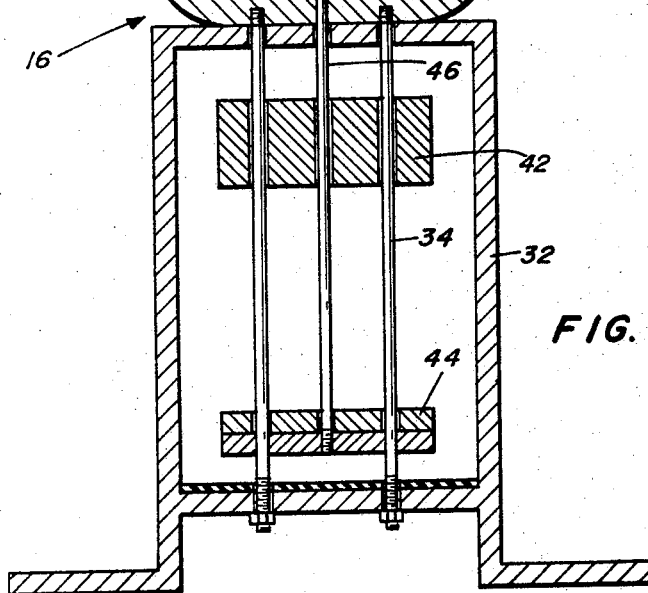
FIG. 4 shows a trace recorded which represents the response of the transducer to a pressure pulse.

Charge amplifier 12 enables the charge sensitivity of the transducer 10 to be determined easily and quickly. The electronic components are connected as shown in FIG. 2 and the sensitivity and range controls of the charge amplifier 12 are set for a nominal input of 30 pCb per psi at 100 psig (3,000 pCb). The gain of the charge amplifier is then adjusted so that the zero and full scale (test signal) outputs cover close to full scale on the oscilloscope grid. The trace 64 is positioned near the bottom of the oscilloscope grid and a main chamber pressure slightly over 100 psig is set. This is necessary since the final pressure in the calibration chamber 18 using this technique must be 100 psig. The added volume of the calibration chamber 18 reduces the initial pressure in the main chamber 36 according to the relation $P_1V_1 = P_2V_2$ where $P_1$ and $V_1$ are the initial pressure and volume of the main chamber 36 and $P_2$ and $V_2$ are the pressure and volume of the combined main chamber 36 and calibration chamber 18 after the poppet valve 40 is opened and equilibrium is achieved. The initial pressure is determined experimentally before beginning the calibration. The tolerance for the final pressure is $100 \pm 0.1$ psig which is easily obtained. A pressure pulse is then generated by releasing the impact weight 42 and the resulting trace is recorded on the storage oscilloscope 14. A representative trace 62 is shown in FIG. 4. The displacement of the trace is then noted at some time $T_1$ when the oscillations have damped. These low frequency oscillations are air pressure oscillations in the calibration chamber 18. Using the trace locator feature on the oscilloscope 14 with the test signal button of the charge amplifier 12 depressed, the charge sensitivity control on the charge amplifier is adjusted so that the displacement of the trace 64 is equal to trace 62 caused by the pressure pulse. With the test signal button depressed, the sweep is initiated. This second trace 64 should fall on the pressure pulse trace 62 at $T_1$. The charge sensitivity of the transducer 10 can then be read directly from the sensitivity control on the charge amplifier 12. The procedure can then be repeated to determine the non-repeatability of the transducer 10. This same procedure can be repeated, for example, at 50 and 20 psi to determine the non-linearity of the transducer.

Obviously many modifications and variations of the present invention are possible in the light of the above teachings.

What is claimed is:

1. A system for the calibration of a transducer comprising:
a main chamber adapted to be pressurized;
a calibration chamber in which the transducer to be calibrated is mounted;
valve means connecting the main chamber to the calibration chamber;
means to quickly open and close the valve between the chambers to produce a pressure pulse whereby the transducer receives the pressure pulse and generates a first signal;
an amplifier for generating a second signal of known value calibrated to represent particular charge sensitivities;
means connecting said first signal to said amplifier;
oscilloscope means connected to said amplifier for recording and storing said first signal and displaying said second signal; and
control means on said amplifier for adjusting the second signal to equal the first signal; said control means calibrated to provide a direct reading of the value of the first signal whereby the charge sensitivity of the transducer may be easily and quickly determined.

2. A method for directly calibrating blast wave transducers comprising:
mounting a transducer in a calibration chamber;
pressurizing a main chamber to a predetermined pressure;
releasing the pressure from the main chamber into the calibration chamber thereby generating a pressure pulse signal from the transducer;
applying the signal from the transducer to a storage oscilloscope to produce a first trace;
generating a second signal of known value calibrated to represent particular charge sensitivities;
applying said second signal to the storage oscilloscope to produce a second trace;

adjusting said second trace to correspond with said first trace whereby the charge sensitivity of the transducer may be directly determined.

* * * * *